United States Patent [19]
Jeunet

[11] Patent Number: 4,776,685
[45] Date of Patent: Oct. 11, 1988

[54] SYSTEM OF SHAKE-PROOF ASSEMBLY FOR PARTS OF SPECTACLES AND LIKE APPLICATIONS

[76] Inventor: Jean-Pierre Jeunet, Rue de l'Evalude, Morez, France, 39400

[21] Appl. No.: 58,848

[22] Filed: Jun. 5, 1987

[30] Foreign Application Priority Data
Jun. 13, 1986 [FR] France .................. 86 08976

[51] Int. Cl.⁴ .................. G02C 1/08; G02C 5/00
[52] U.S. Cl. .................. 351/90; 351/141
[58] Field of Search .................. 351/90, 91, 140, 141, 351/92, 93, 94, 95, 96, 97, 98, 99, 100, 101; 411/44, 57, 60

[56] References Cited
U.S. PATENT DOCUMENTS
1,521,484 12/1924 Stevens .
2,740,327 4/1956 Stegeman .
3,006,246 10/1961 Lorenzo .................. 351/91

Primary Examiner—Rodney B. Bovernick
Assistant Examiner—P. M. Dzierzynski
Attorney, Agent, or Firm—Dowell & Dowell

[57] ABSTRACT

This invention relates to a shake-proof assembly for parts of spectacles and like applications, wherein there is engaged on the screw a bush provided with oblique jaws which, when the screw is placed in position, are pushed radially against the shank thereof by an inner shoulder formed with the bore of the parts of the spectacles.

7 Claims, 3 Drawing Sheets

SYSTEM OF SHAKE-PROOF ASSEMBLY FOR PARTS OF SPECTACLES AND LIKE APPLICATIONS

BACKGROUND OF THE INVENTION

1. Field of the Invention

The present invention relates to the spectaclemaking industry and concerns more especially the mutual assembly of certain of the elements constituting the frames, such as in particular the eyewire clamps intended for retaining the lenses within the bezels of the face of metal glasses.

2. History of the Related Art

Such assembly is generally obtained with the aid of screws which allow dismantling, for example for replacing one of the lenses in the above-mentioned case of eyewire clamps. Practice has shown that these screws, of which the thread most often is steeply pitched, unscrew very easily, with the result that, in order to avoid any risk of untimely disconnection, angular blocking of each screw must be provided.

In practice, a certain number of angular blocking elements tending to render the screw shake-proof have been proposed. In particular, hammering or superficial gluing notched surfaces beneath the head, of the screws or the positioning of a longitudinal retaining pallet made of plastics material, similar to a key, have been proposed. However, these known techniques are not entirely satisfactory, for, if they are conducted so as to prove really efficient, they oppose the voluntary removal of the assembly screw, for example upon replacement of a lens in the case of an eyewire clamp, or are no longer efficient after several successive assemblies.

SUMMARY OF THE INVENTION

It is a principal object of the present invention to overcome the drawback of prior art fasteners for eye wear and the invention relates to this end to a shake-proof system of assembly which consists essentially in mounting axially on the screw a bush of which the outer conical wall is slit longitudinally so as to be deformable, while, inside the smooth part of the bore which is to receive the screw, there is provided an annular shoulder adapted to abut, upon screwing, against the conical wall of the bush in order to urge it by deformation against the shank of the screw which is thus immobilized or secured angularly.

BRIEF DESCRIPTION OF THE DRAWINGS

The invention will be more readily understood on reading the following description with reference to the accompanying drawings, in which.

DESCRIPTION OF THE PREFERRED EMBODIMENT

Figure 1:
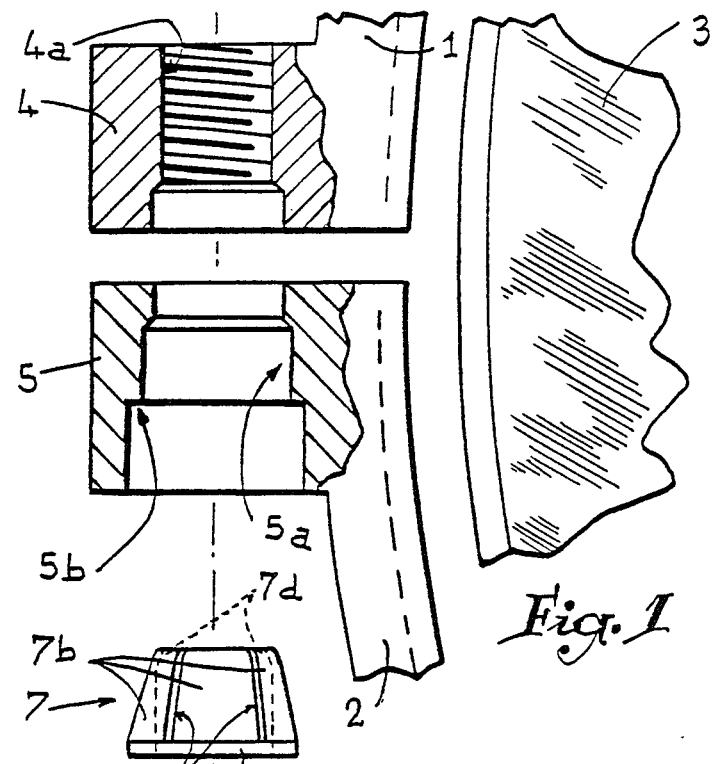
FIG. 1 is an axial section assembly view showing the different elements of a shake-proof assembly according to the invention.

Referring now to the drawings, it has been assumed that the invention is applied to the assembly of one of the two eyewire clamps of a metal spectacle frame. The representation has, of course, been made to a large scale so as more readily to illustrate the invention.

References 1 and 2 designate the two ends of the eyewire of the face of the frame, which eyewire is hollowed out with the bezel adapted to receive the edge of a lens such as 3. The eyewire clamp associated with eyewire 1,2 comprises two transverse blocks 4, 5, respectively, which must be brought together and assembled to ensure retention of the lens 3.

The system of assembly according to the invention comprises a screw 6 associated with a bush 7. In the embodiment envisaged in FIGS. 1 to 3, and as clearly shown in FIG. 2, the bush 7 comprises a continuous ring $7a$, longitudinally secured with a series of jaws $7b$ oriented obliquely, thus giving the bush a truncated profile whose large base corresponds to the ring $7a$.

Screw 6 is intended to pass freely through a bore $5a$ made in the block 5, before being screwed in a corresponding tapping $4a$ made in the block 4. According to the invention, an annular shoulder $5b$, determined by two parts of different diameters, has been provided inside the bore $5a$.

Bush 7 is engaged on the screw 6, being turned so that its ring $7a$ is disposed against the projecting head $6a$ of the screw. Under these conditions, it will be readily appreciated that, when this screw 6 is rotated in order to screw in the tapping $4a$ (cf. FIG. 3), the jaws $7b$, which are capable of deforming elastically due to their mutual independence, abut against the shoulder $5b$ which pushes them radially inwardly, thus causing the jaws to abut against the smooth part of the shank of the screw 6. It will be observed that the longitudinal edges $7c$ of the jaws $7b$ constitute edges which, by anchoring against the shoulder $5b$, ensure angular immobilization of the bush 7, with the result that the screw 6 is thus tightly retained and cannot unscrew in untimely manner, while remaining capable of being dismantled for the purpose of replacing the lens 3.

Tests have shown that the shake-proof assembly according to the invention proved perfectly efficient. It will be observed that this efficiency is further reinforced due to the relatively malleable nature of the nickel silver which most often constitutes the eyewires of metal frames and which is hammered at the level of shoulder $5b$.

In order to render the bush 7 captive prior to assembly thereof on the spectacle frame, the shank of the screw 6 may advantageously be provided with a groove $6b$ adapted to form stop for the ends $7d$ of the deformable jaws $7b$, bent inwardly in the manner of grasping hooks. This bush 7 is thus retained on the screw 6, in the manner illustrated at $7'$ in FIG. 1.

Figure 5:
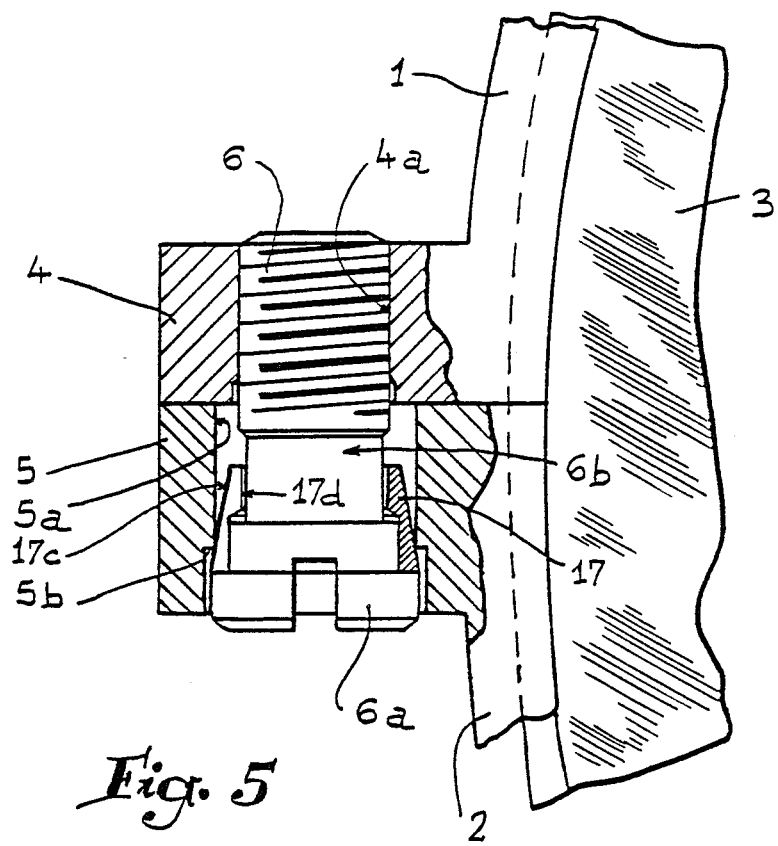
FIGS. 4 and 5 are views corresponding to FIG. 2 and FIG. 3, respectively, but illustrating a variant embodiment of the invention.
Figure 4:
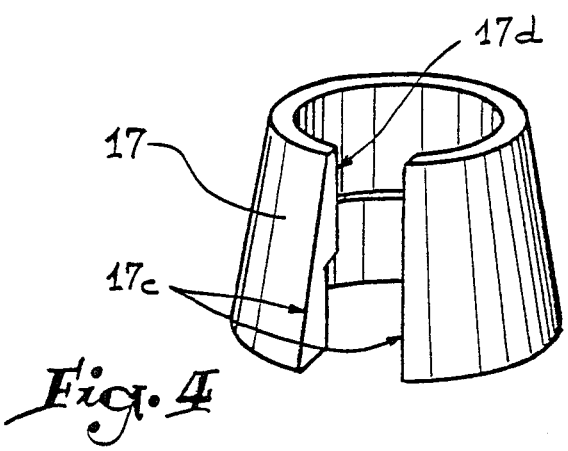

It will be understood that the number of jaws $7b$ of the bush may vary to a wide extent. FIGS. 4 and 5 illustrate a variant in which the bush, referenced 17, is cut out with a single longitudinal slot which, after removal of matter, defines two edges $17c$. Operation is identical, in that the bush 17 deforms radially under the action of the shoulder $5b$ and is applied against screw 6.

Figure 3:
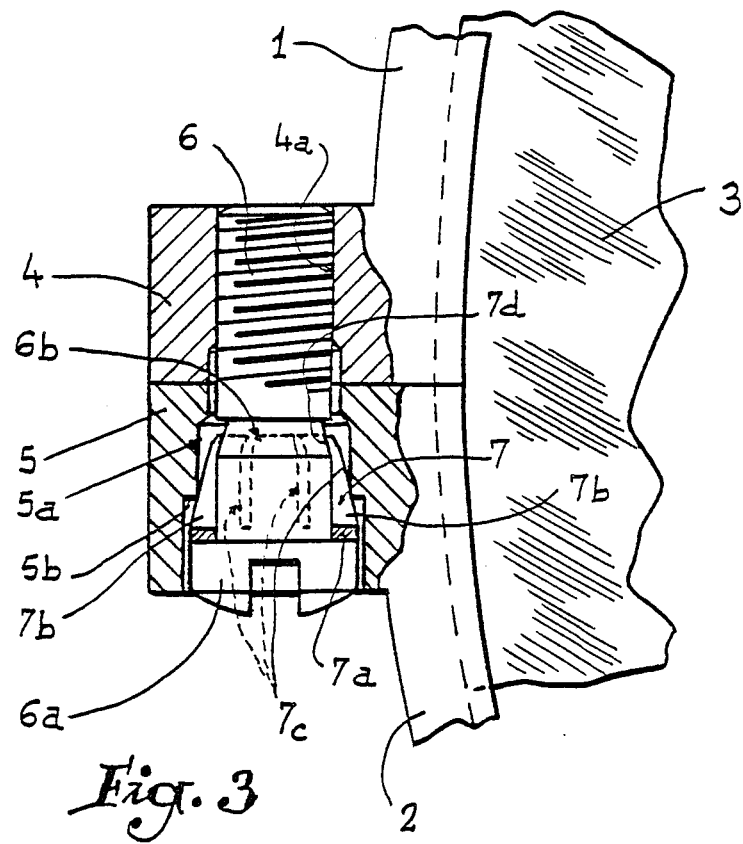
FIG. 3 reproduces FIG. 1 after assembly of the elements and tightening of the assembly screw.
Figure 2:
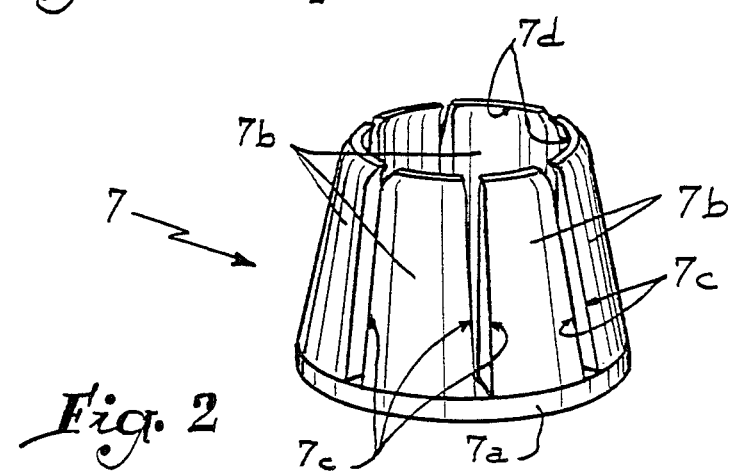
FIG. 2 is a view in perspective of the bush, of the present invention.

In the case of FIGS. 1 to 3 as well as in that of FIGS. 4 and 5, it should be observed that withdrawal of the bush 7 or 17 upon manual unscrewing is ensured by abutment of the edge of groove 6b against the ends 7d, 17d. However, care should be taken that withdrawal of the bush and disappearance of the angular retention effect occur only against a noteworthy angular movement (one turn, for example), so as to allow adjustment of the screwing without causing release of the screw 6. Tests have shown, on this subject, that retention is maintained even if the head 6a of the screw 6 is no longer in abutment against the bush 7, 17.

Figure 6:
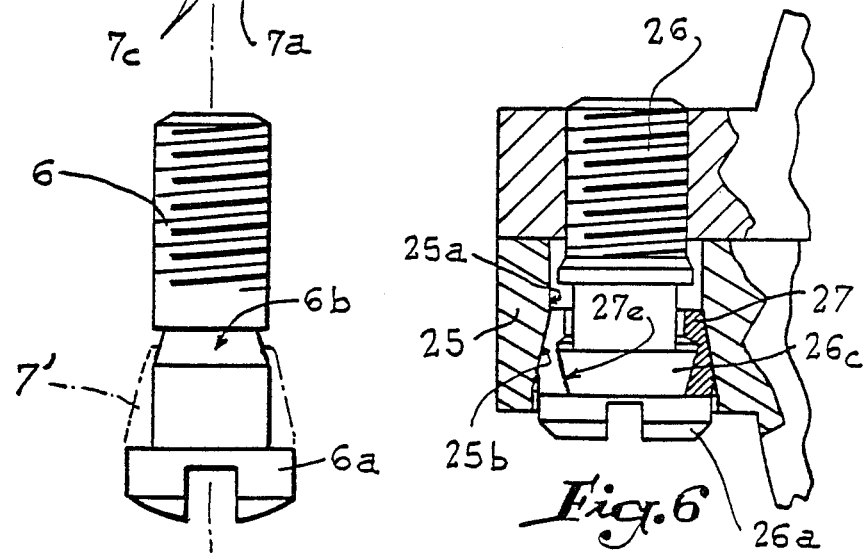
FIG. 6 illustrates another variant embodiment.

When it is desired to render the system virtually disassemblable, the embodiment illustrated in FIG. 6 may be employed, in which the bush, referenced 27, presents an inner bearing surface 27e with conical profile adapted to apply against a corresponding bearing surface 26c likewise with conical profile made on the screw 26, level with the head 26a thereof, while the bore 25a of the block 25 comprises a part 25b with a conical profile opposite that of the bearing surface 26c. The part 25b performs the same role as the shoulder 5b to compress the bush 27 radially when the screw 26 is tightened, but the inversion of the conical sections has for its result that the unscrewing of the screw 26 still ensures radial compression of the bush and therefore increases the mechanical retention of the screw.

Furthermore, it will be readily appreciated that, although the invention is more especially concerned with the domain of spectacles, it may also find advantageous applications in other technical sectors where equivalent problems of angular retention arise.

What is claimed is:

1. A shake-proof assembly for securing first and second opposing blocks of a clamping frame for eyeglasses wherein the first and second opposing blocks have aligned bores therethrough and wherein threads are provided within the bores of the first block comprising, a screw member having a head portion, a shank portion and a threaded end portion which is threadingly engageable with the bore of the first block, an inwardly extending annular shoulder formed with the bore of the second block, a bush having first and second ends and having generally conical side walls, an opening through said bush defined by said side walls, at least one elongated slot formed in said side walls, said bush being of a size to be seated within the bore of said second block with a portion of said side walls thereof engaging said annular shoulder, said screw member being receivable through said opening through said bush and extending therefrom so as to be threadingly engageable with the bore of said first block, said side walls of said bush being urged toward one another by said annular shoulder to clamp said first end of said bush into tight engagement with said shank portion of said screw member as said screw member is threaded toward the first block thereby clampingly securing said crew member within the bore of the second block.

2. The shake-proof assembly of claim 1 in which said screw member includes an annular recess in said shank portion thereof, said first end of said bush being seated within said annular recess when said side walls thereof are urged inwardly by said annular shoulder.

3. The shake-proof assembly of claim 2 in which said bush includes a plurality of elongated slots formed in said side walls thereof to thereby separate said side walls into a plurality of deformable jaw elements, said first end of each of said gripping elements having in-turned edges, said in-turned edges engaging said shank portion of screw member as said deformable jaw elements are urged toward one another by said annular shoulder.

4. The shake-proof assembly of claim 1 in which said annular shoulder tapers inwardly along the bore of said second block and towards the first block, said opening through said bush including an outwardly flared groove spaced from said first end thereof which tapers toward said second end thereof in a direction opposite to that of said taper of said annular shoulder, and said screw member including an annular bearing surface which tapers inwardly toward and adjacent said head portion thereof which bearing surface is cooperatively engaged with said flared groove of said bush to thereby prevent said screw member from being disengaged from said second block.

5. The shake-proof assembly of claim 4 in which said bush includes a plurality of elongated slots formed in said side walls thereof to thereby separate said side walls into a plurality of deformable jaw elements, said first end of each of said gripping elements having in-turned edges, said in-turned edges engaging said shank portion of screw member as said deformable jaw elements are urged toward one another by said annular shoulder.

6. The shake-proof assembly of claim 1 in which said bush includes a plurality of elongated slots formed in said side walls thereof to thereby separate said side walls into a plurality of deformable jaw elements, said first end of each of said gripping elements having in-turned edges, said in-turned edges engaging said shank portion of screw member as said deformable jaw elements are urged toward one another by said annular shoulder.

7. The shake-proof assembly of claim 6 in which said second end of said bush includes a ring element, said ring element being engageable by said head portion of said screw member so as to urge said bush toward said annular shoulder as said screw member is threadingly engaged with the threaded bore of the first block.

* * * * *